(12) United States Patent
Lu (10) Patent No.: US 11,309,616 B2
(45) Date of Patent: Apr. 19, 2022

(54) TUNABLE BAND-STOP FILTER, METHOD OF DRIVING THE SAME AND ELECTRONIC DEVICE (71) Applicant: BOE TECHNOLOGY GROUP CO., LTD., Beijing (CN)

(72) Inventor: Yongchun Lu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 394 days.

(21) Appl. No.: 16/496,626

(22) PCT Filed: Feb. 25, 2019

(86) PCT No.: PCT/CN2019/076070
§ 371 (c)(1),
(2) Date: Sep. 23, 2019

(87) PCT Pub. No.: WO2019/233127
PCT Pub. Date: Dec. 12, 2019

(65) Prior Publication Data
US 2021/0408651 A1 Dec. 30, 2021

(30) Foreign Application Priority Data
Jun. 8, 2018 (CN) .......................... 201810586919.1

(51) Int. Cl.
H01P 1/203 (2006.01)
G02F 1/13 (2006.01)
G02F 1/1337 (2006.01)

(52) U.S. Cl.
CPC ........ H01P 1/20327 (2013.01); G02F 1/1313 (2013.01); G02F 1/1337 (2013.01)

(58) Field of Classification Search
CPC ... H01P 1/20327; G02F 1/1313; G02F 1/1337
(Continued)

(56) References Cited

U.S. PATENT DOCUMENTS

2013/0128132 A1   5/2013   Kholodyak et al.

FOREIGN PATENT DOCUMENTS

CN   104393378 A   3/2015
CN   205015575 U   2/2016
(Continued)

OTHER PUBLICATIONS

First Chinese Office Action dated Mar. 27, 2019.
(Continued)

Primary Examiner — Nathanael R Briggs
Assistant Examiner — William D Peterson
(74) Attorney, Agent, or Firm — Dilworth & Barrese, LLP.; Michael J. Musella, Esq.

(57) ABSTRACT

A tunable band-stop filter, a method of driving a tunable band-stop filter and an electronic device are provided. The tunable band-stop filter includes a first substrate, a second substrate, and a liquid crystal layer sandwiched between the first substrate and the second substrate. The first substrate includes a wire structure on a first base substrate, the second substrate includes a common electrode on a second base substrate. The wire structure includes a first wire structure and a second wire structure. The first wire structure, the common electrode, and the liquid crystal layer between the first wire structure and the common electrode constitute a first phase modulation structure, and the second wire structure, the common electrode, and the liquid crystal layer between the second wire structure and the common electrode constitute a second phase modulation structure.

20 Claims, 3 Drawing Sheets (58) Field of Classification Search
USPC .......................................................... 333/204
See application file for complete search history.

(56) References Cited

FOREIGN PATENT DOCUMENTS

| | | | |
|---|---|---|---|
| CN | 106970483 | A | 7/2017 |
| CN | 107394318 | A | 11/2017 |
| CN | 107579318 | A * | 1/2018 |
| CN | 107579318 | A | 1/2018 |
| CN | 108493528 | A | 9/2018 |
| JP | 2003017912 | A | 1/2003 |

OTHER PUBLICATIONS

Second Chinese Office Action dated Jul. 22, 2019.
Zahari, M.K. et al, Reconfigurable Dual-Mode Ring Resonator Matched Bandstop Filter, 2012 IEEE Symposium on Wireless Technology and Applications (ISWTA), Sep. 23-26, 2012, Bandung, Indonesia.
Chang, Yuhsin, Broadband Plasmonic Bandstop Filters With a Single Rectangular Ring Resonator, https://www.onacademic.com/detail/journal_1000036803703810_959b.html; published 2014.
Xue Zheng Design of Bandpass Filter for Fourth Child Based on Ring Bridge, Mar. 2017 Full-text database of Chinese excellent master's theses (electronic journal).

* cited by examiner

TUNABLE BAND-STOP FILTER, METHOD OF DRIVING THE SAME AND ELECTRONIC DEVICE

The present application claims priority of the Chinese Patent Application No. 201810586919.1, filed on Jun. 8, 2018, the entire disclosure of which is incorporated herein by reference as part of the present application.

TECHNICAL FIELD

Embodiments of the present disclosure relate to a tunable band-stop filter, a method of driving a tunable band-stop filter and an electronic device.

BACKGROUND

Band-stop filters (BSF) refer to filters that may pass through electromagnetic waves with most frequency ranges and attenuate electromagnetic waves with certain frequency ranges to an extremely low level. Tunable band-stop filters refer to band-stop filters whose operation frequency (i.e. a center frequency of a stop band) may change with an external control signal. In modern wireless communication technology, the tunable band-stop filters are of significance to reduce system noise and resist clutter signal interference in working environment.

Based on different implementation methods, the tunable band-stop filters may be classified as diode-based tunable band-stop filters, MEMS-based tunable band-stop filters, and tunable band-stop filters based on electronic control media (including ferrite, ferroelectric, liquid crystal, etc.)

SUMMARY

Embodiments of the present disclosure provide a tunable band-stop filter, a method of driving a tunable band-stop filter and an electronic device. An embodiment of the present disclosure provides a tunable band-stop filter, comprising: a first substrate comprising a first base substrate and a wire structure on the first base substrate; a second substrate comprising a second base substrate and a common electrode on the second base substrate; and a liquid crystal layer between the first substrate and the second substrate. The wire structure comprises a first wire structure and a second wire structure, and a first endpoint of the first wire structure is connected to a first endpoint of the second wire structure, a second endpoint of the first wire structure is connected to a second endpoint of the second wire structure, the first endpoint of the first wire structure and the first endpoint of the second wire structure are configured to input electromagnetic wave signals, the second endpoint of the first wire structure and the second endpoint of the second wire structure are configured to output the electromagnetic wave signals, the first wire structure, the common electrode and a liquid crystal layer between the first wire structure and the common electrode constitute a first phase modulation structure, and the second wire structure, the common electrode and a liquid crystal layer between the second wire structure and the common electrode constitute a second phase modulation structure.

For example, in the tunable band-stop filter provided by an embodiment of the present disclosure, the first substrate comprises a wire arranged on the first base substrate, and the wire is connected end to end to form the wire structure.

For example, in the tunable band-stop filter provided by an embodiment of the present disclosure, the wire is a bent wire.

For example, in the tunable band-stop filter provided by an embodiment of the present disclosure, the wire is a serpentine bent wire.

For example, in the tunable band-stop filter provided by an embodiment of the present disclosure, the first phase modulation structure and the second phase modulation structure are configured to modulate phases of electromagnetic wave signals input from the first endpoint of the first wire structure and the first endpoint of the second wire structure, respectively, to allow a phase of an electromagnetic wave having a filtering frequency range among electromagnetic wave signals modulated by the first phase modulation structure to be opposite to a phase of an electromagnetic wave having the filtering frequency range among electromagnetic wave signals modulated by the second phase modulation structure.

For example, in the tunable band-stop filter provided by an embodiment of the present disclosure, the second phase modulation structure is configured to change a phase of an electromagnetic wave having the filtering frequency range among the electromagnetic wave signals by 90 degrees, and the first phase modulation structure is configured to change a phase of an electromagnetic wave having the filtering frequency range among the electromagnetic wave signals by 270 degrees.

For example, in the tunable band-stop filter provided by an embodiment of the present disclosure, a wire length of a first wire structure in the first phase modulation structure is three times a wire length of a second wire structure in the second phase modulation structure.

For example, in the tunable band-stop filter provided by an embodiment of the present disclosure, the first wire structure comprises three sub-first wire structures, and wire lengths of the three sub-first wire structures are equal to each other.

For example, in the tunable band-stop filter provided by an embodiment of the present disclosure, the wire is further configured to apply a drive voltage to form a bias electric field with the common electrode, to change a dielectric constant of the liquid crystal layer between the wire and the common electrode.

For example, the tunable band-stop filter provided by an embodiment of the present disclosure further comprises a bias voltage source, electrically connected to the wire and configured to apply the drive voltage to the wire.

For example, the tunable band-stop filter provided by an embodiment of the present disclosure further comprises a first signal line connected to the first endpoint of the first wire structure and the first endpoint of the second wire structure; and a second signal line connected to the second endpoint of the first wire structure and the second endpoint of the second wire structure.

For example, the tunable band-stop filter provided by an embodiment of the present disclosure further comprises: a first alignment film arranged on a surface of the first substrate near the liquid crystal layer; and a second alignment film arranged on a surface of the second substrate near the liquid crystal layer. The first alignment film and the second alignment film are configured to align liquid crystal molecules in the liquid crystal layer.

For example, the tunable band-stop filter provided by an embodiment of the present disclosure further comprises microspheres provided in the liquid crystal layer and configured to support a space between the first base substrate and the second base substrate.

For example, in the tunable band-stop filter provided by an embodiment of the present disclosure, the liquid crystal comprises nematic liquid crystal.

At least one embodiment of the present disclosure also provides a method of driving the tunable band-stop filter, comprising: applying a drive voltage to the wire to change a dielectric constant of a liquid crystal layer between the wire and the common electrode; and controlling a magnitude of the drive voltage to adjust a filtering frequency range of the tunable band-stop filter.

At least one embodiment of the present disclosure also provides an electronic device, comprising the tunable band-stop filter.

BRIEF DESCRIPTION OF THE DRAWINGS

A brief description will be given below to the accompanying drawings of the embodiments to provide a more clear understanding of the technical proposals of the embodiments of the present disclosure. Apparently, the drawings described below only involve some embodiments of the present disclosure but are not intended to limit the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by those of ordinary skill in the art to which the present disclosure belongs. The terms "first," "second," or the like, which are used in the description and the claims of the present disclosure, are not intended to indicate any sequence, amount or importance, but used to distinguish various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled," or the like, are not limited to a physical connection or mechanical connection, but may include an electrical connection/coupling, directly or indirectly.

At present, a common tunable band-stop filter either has a lower operation frequency (such as a diode-based tunable band-stop filter), or has a complex process and high cost (such as a MEMS-based tunable band-stop filter), or has large loss and strong nonlinear noise (such as a tunable band-stop filter based on ferrite, ferroelectric materials, or the like), which greatly limits application scenarios of a tunable band-stop filter. Theoretically, a tunable band-stop filter may also be designed by using liquid crystal materials. However, for microwave, the liquid crystal materials often have only a small tuning rate in the microwave band, thus a regulation range of a microwave tunable band-stop filter may be limited.

In the research, the inventors of the present disclosure contemplated that the phase reverse cancellation principle may be used to attenuate electromagnetic waves in certain frequency ranges to extremely low levels, and a band-stop filter is implemented. Then, a variable dielectric constant of the liquid crystal may be used to control the frequency range in which the phase reverse cancellation occurs, and a tunable band-stop filter based on liquid crystal material with a larger regulation range is implemented.

Embodiments of the present disclosure provide a tunable band-stop filter, a method of driving a tunable band-stop filter and an electronic device. The tunable band-stop filter includes a first substrate, a second substrate and a liquid crystal layer sandwiched between the first substrate and the second substrate. The first substrate includes a first base substrate and a wire on the first base substrate; the second substrate includes a second base substrate and a common electrode on the second base substrate. The wire is connected end to end to form a wire structure. The wire structure includes a first wire structure and a second wire structure, and a first endpoint of the first wire structure is connected to a first endpoint of the second wire structure, a second endpoint of the first wire structure is connected to a second endpoint of the second wire structure. The first endpoint of the first wire structure and the first endpoint of the second wire structure are configured to input electromagnetic wave signals, the second endpoint of the first wire structure and the second endpoint of the second wire structure are configured to output the electromagnetic wave signals. The first wire structure, the common electrode and a liquid crystal layer between the first wire structure and the common electrode constitute a first phase modulation structure, and the second wire structure, the common electrode and a liquid crystal layer between the second wire structure and the common electrode constitute a second phase modulation structure. In this tunable band-stop filter, the first phase modulation structure and the second phase modulation structure are configured to modulate phases of electromagnetic wave signals input from the first endpoint of the first wire structure and the first endpoint of the second wire structure, respectively, so that electromagnetic waves having a certain frequency range (filtering frequency range) among electromagnetic wave signals from the first endpoint of the first wire structure and the first endpoint of the second wire structure may be attenuated to an extremely low level at the second endpoint of the first wire structure and the second endpoint of the second wire structure by using a phase reverse cancellation principle, and output from the second endpoint of the first wire structure and the second endpoint of the second wire structure. In addition, because an electric field may be formed between the wire structure and the common electrode by using the wire structure and the common electrode, liquid crystal molecules in the liquid crystal layer are driven to deflect and a dielectric constant of the liquid crystal layer is changed. By changing the dielectric constant of the liquid crystal layer, an equivalent phase shift constant of a liquid crystal microwave transmission structure may be changed, so that the filtering frequency range described above, i.e. a frequency range in which the phase reverse cancellation occurs, may be changed, and an efficient tunable band-stop filter may be provided. In addition, the tunable band-stop filter also has advantages of simple structure, wide effective operation frequency range, low production cost, small loss, small non-linear noise, and large regulation range, etc.

A tunable band-stop filter, a method of driving a tunable band-stop filter and an electronic device provided by the embodiments of the present disclosure are illustrated with reference to the accompanying drawings.

Figure 1:
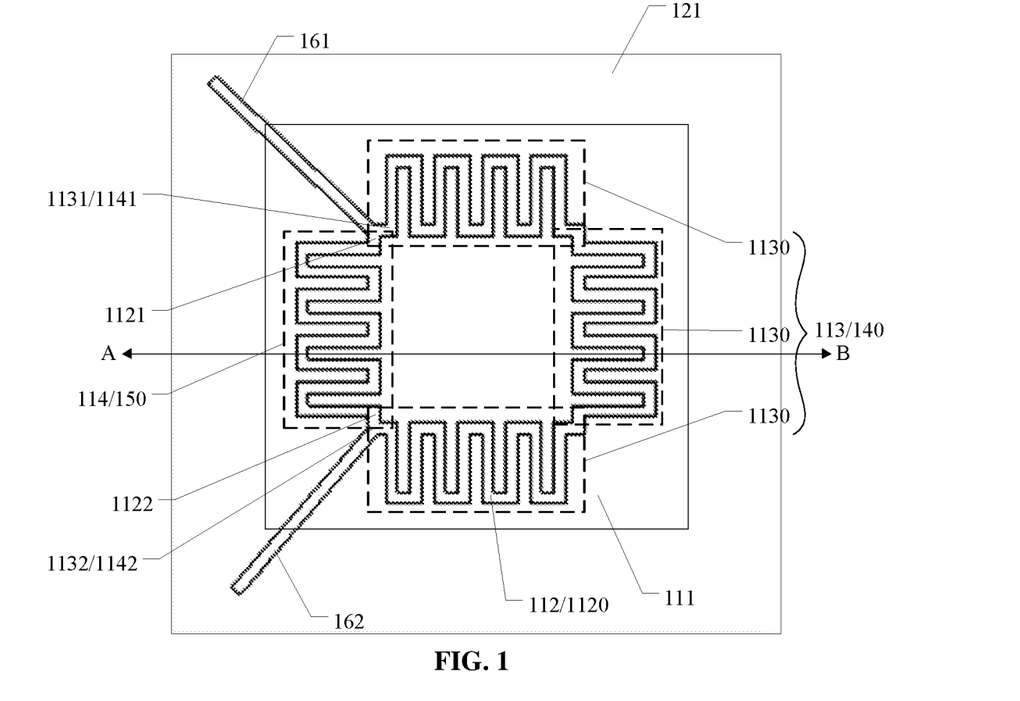
FIG. 1 is a plan diagram of a tunable band-stop filter provided by an embodiment of the present disclosure.
Figure 2:
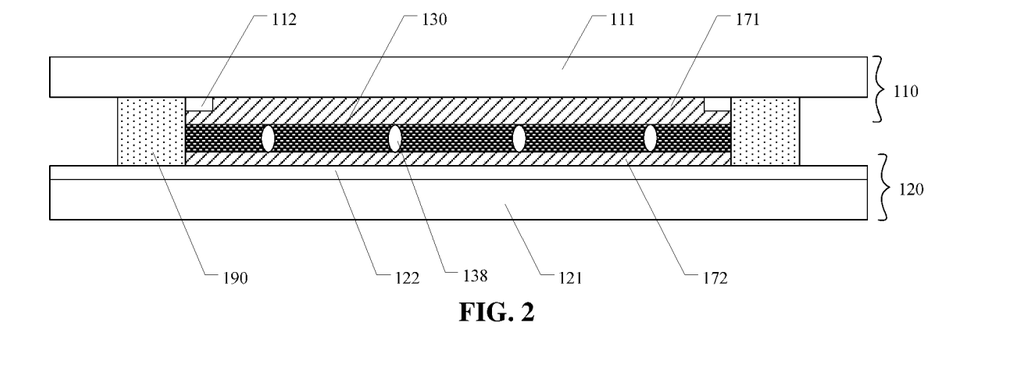
FIG. 2 is a schematically cross-sectional view of a tunable band-stop filter provided by an embodiment of the present disclosure along the AB direction in FIG. 1.

FIG. 1 is a plan diagram of a tunable band-stop filter provided by an embodiment of the present disclosure; FIG. 2 is a schematically cross-sectional view of a tunable band-stop filter provided by an embodiment of the present disclosure along the AB direction in FIG. 1;

As illustrated in FIGS. 1 and 2, the tunable band-stop filter includes a first substrate 110, a second substrate 120, and a liquid crystal layer 130 sandwiched between the first substrate 110 and the second substrate 120. For example, the first substrate 110 and the second substrate 120 may be cell-assembled, and the liquid crystal layer 130 is encapsulated between the first substrate 110 and the second substrate 120 using an encapsulating material 190.

For example, as illustrated in FIG. 1, the first substrate 110 includes a first base substrate 111 and a wire 112 arranged on the first base substrate 111. For example, a material of the wire 112 may be a metal material. The wire 112 is connected end to end to form a wire structure 1120. The wire structure 1120 includes a first wire structure 113 and a second wire structure 114. A first endpoint 1131 of the first wire structure 113 and a first endpoint 1141 of the second wire structure 114 are connected for constituting a first node 1121, and a second endpoint 1132 of the first wire structure 113 and a second endpoint 1142 of the second wire structure 114 are connected for constituting a second node 1122, that is, the wire structure 1120 is divided into the first wire structure 113 and the second wire structure 114 by the first node 1121 and the second node 1122. The first node 1121 is configured to input electromagnetic wave signals, and the second node 1122 is configured to output the electromagnetic wave signals. That is, one terminal of the first wire structure 113 is connected to the first node 1121 and the other terminal is connected to the second node 1122; one terminal of the second wire structure 114 is connected to the first node 1121 and the other terminal is connected to the second node 1122. It is to be noted that, for simplicity of description, the following first node 1121 represents the first endpoint 1131 of the first wire structure 113 and the first endpoint 1141 of the second wire structure 114 which are connected with each other, and the following second node 1122 represents the second endpoint 1132 of the first wire structure 113 and the second endpoint 1142 of the second wire structure 114 which are connected with each other.

As illustrated in FIG. 2, the second substrate 120 includes a second base substrate 121 and a common electrode 122 arranged on the second base substrate 121. For example, a material of the common electrode 122 may be a metal material. A forward projection of the wire 112 on the second base substrate 121 falls into a forward projection of the common electrode 122 on the second base substrate 121. At this time, the first wire structure 113 and the common electrode 122 may constitute a first transmission channel for electromagnetic wave signals, and the second wire structure 114 and the common electrode 122 may also constitute a second transmission channel for electromagnetic wave signals. Electromagnetic wave signal input from the first node 1121 may be transmitted to the second node 1122 through the first transmission channel and the second transmission channel described above, respectively. Meanwhile, as illustrated in FIGS. 1 and 2, the first wire structure 113, the common electrode 122, and the liquid crystal layer 130 between the first wire structure 113 and the common electrode 122 constitute a first phase modulation structure 140, and the second wire structure 114, the common electrode 122, and the liquid crystal layer 130 between the second wire structure 114 and the common electrode 122 constitute a second phase modulation structure 150. It is to be noted that in the first phase modulation structure described above, a common electrode constituting the first phase modulation structure refers to a common electrode portion in a region opposite to the first wire structure, while in the second phase modulation structure described above, a common electrode constituting the second phase modulation structure refers to a common electrode portion in a region opposite to the second wire structure.

In the tunable band-stop filter provided in this embodiment, the first phase modulation structure 140 and the second phase modulation structure 150 may modulate phases of the electromagnetic wave signals from the first node 1121, respectively, so that an electromagnetic wave having a certain frequency range (filtering frequency range) among electromagnetic wave signals from the first node 1121 may be attenuated to an extremely low level at the second node 1122 by using the phase reverse cancellation principle, and the filtered electromagnetic waves are output from the second node 1122. That is, the first phase modulation structure 130 and the second phase modulation structure 140 may modulate the phases of the electromagnetic wave signals input from the first node 1121, respectively, so that the phase of the electromagnetic wave having the filtering frequency range among electromagnetic wave signals modulated by the first phase modulation structure 140 is opposite to the phase of the electromagnetic wave having the filtering frequency range among electromagnetic wave signals modulated by the second phase modulation structure 150, so that a phase reverse cancellation phenomenon occurs at the second node 1122. At this time, the electromagnetic wave having the filtering frequency range among the electromagnetic wave signals from the first node 1121 is attenuated to an extremely low level, and the tunable band-stop filter plays a role of band-stop filtering. It is to be noted that the certain frequency range or filtering frequency range described above may be set according to actual needs, and relevant parameters of the first phase modulation structure and the second phase modulation structure (e.g., selection of liquid crystal materials, thickness of the liquid crystal layer, wire length of the first wire structure or wire length of the second wire structure, etc.) may be designed according to the above filtering frequency range.

In the tunable band-stop filter provided in this embodiment, a drive voltage may be applied to the wire 112 to form a bias electric field with the common electrode 122. In this way, liquid crystal molecules in the liquid crystal layer 130 are driven to deflect and a dielectric constant of the liquid crystal layer 130 is changed. By changing the dielectric constant of the liquid crystal layer, an equivalent phase shift constant of a liquid crystal microwave transmission structure may be changed. In this way, the filtering frequency range described above, i.e. the frequency range in which the phase reverse cancellation occurs, may be changed, and an efficient tunable band-stop filter may be provided.

In addition, the tunable band-stop filter also has the following advantages: first, because a liquid crystal material are adopted as a control medium, the effective operation frequency range of the tunable band-stop filter is wide, including both a low-frequency end of microwave and a high-frequency end of microwave; secondly, the tunable band-stop filter has a simple structure and low cost; thirdly, a radio frequency switch of the tunable band-stop filter has advantages of low loss and low non-linear noise, because a liquid crystal material with very low loss has been developed and linearity of the liquid crystal material itself is very high; fourthly, the tunable band-stop filter has a large regulation range. It is to be noted that the regulation range described above refers to an adjustment range of the filtering frequency range of the tunable band-stop filter, for example, an offset range of a center operation frequency of the filtering frequency range of the tunable band-stop filter.

For example, in some embodiments, a first base substrate and a second base substrate act as a support, a protector, an insulator, etc., and may be further used to prevent electromagnetic wave leakage, so as to reduce radiation loss of a liquid crystal phase shifter.

For example, in some embodiments, a first base substrate and a second base substrate may be a printed circuit board (PCB), respectively, so the tunable band-stop filter may be processed by a PCB process, which reduces production costs. The printed circuit board may use, for example, a plastic substrate, a ceramic substrate, or the like. For example, the first base substrate and the second base substrate may also use Rogers high-frequency plate and material is polytetrafluoroethylene. However, the embodiments of the present disclosure are not limited thereto.

For example, in some embodiments, the tunable band-stop filter may be processed by the manufacturing equipment and process of the liquid crystal display panel, for example, a wire may be formed by processes, such as exposure, development, etching, etc.

For example, in some embodiments, a liquid crystal layer uses a single liquid crystal material with large anisotropy, such as nematic liquid crystal, or the like, and may also use a mixed liquid crystal material (mixed crystal), as long as it can be used as a control medium, and the embodiments of the present disclosure do not limit it. A thickness of the liquid crystal layer may be determined according to actual requirements, for example, according to response time and filtering frequency range.

For example, in some embodiments, the wire 112 may be made of copper, aluminum, gold, silver, or alloys thereof, or other applicable metal materials.

For example, in some embodiments, as illustrated in FIG. 1, the wire 112 may be a bent wire, so that a wire 112 with a longer length can be laid in a smaller region. In this way, a volume of the tunable band-stop filter may be decreased.

For example, in some embodiments, as illustrated in FIG. 1, the wire 112 may be a serpentine bent wire. It is to be noted that a corner of the serpentine bent wire described above may be a right angle, or a rounded corner, and the embodiments of the present disclosure do not limit it.

For example, in some embodiments, the second phase modulation structure 150 is configured to change a phase of an electromagnetic wave having a filtering frequency range among electromagnetic wave signals from the first node 1121 by 90 degrees, and the first phase modulation structure 140 is configured to change a phase of an electromagnetic wave having the filtering frequency range among electromagnetic wave signals from the first node 1121 by 270 degrees. An electromagnetic wave having the filtering frequency range whose phase changes by 90 degrees and an electromagnetic wave having the filtering frequency range whose phase changes by 270 degrees have opposite phases, and the phase reverse cancellation phenomenon occurs at the second node 1122. At this time, an electromagnetic wave having the filtering frequency range among electromagnetic wave signals output from the second node 1122 is attenuated to an extremely low level.

For example, in some embodiments, as illustrated in FIG. 1, a wire length of the first wire structure 113 in the first phase modulation structure 140 is three times a wire length of the second wire structure 114 in the second phase modulation structure 150. When the second phase modulation structure 150 changes the phase of the electromagnetic wave having the filtering frequency range among the electromagnetic wave signals from the first node 1121 by 90 degrees, the first phase modulation structure 140 may change the phase of the electromagnetic wave having the filtering frequency range among the electromagnetic wave signals from the first node 1121 by 270 degrees. It is to be noted that the wire length described above refers to the length of the wire in the first wire structure or the second wire structure.

For example, in some embodiments, as illustrated in FIG. 1, the first wire structure 113 includes three sub-first wire structures 1130, and lengths of wire lengths of the three sub-first wire structures 1130 are equal to each other. That is, a length of a wire length of each sub-first wire structure 1130 is equal to a length of a wire length of the second wire structure 114.

For example, in some embodiments, as illustrated in FIG. 1, the three sub-first wire structures 1130 and one second wire structure 114 may substantially form a square ring. An upper left corner of the square ring is the first node 1121, a lower left corner of the square ring is the second node 1122, and the three sub-first wire structures 1130 and the one second wire structure 114 form four sides of the square ring.

For example, in some embodiments, as illustrated in FIG. 1, the tunable band-stop filter may further include a first signal line 161 which is connected to the first node 1121 and a second signal line 162 which is connected to the second node 1122. In this way, electromagnetic wave signals may be input to the first node 1121 through the first signal line 161, and the electromagnetic wave signals may be output from the second node 1122 through the second signal line 162. The first signal line 161 or the second signal line 162 may also be used to apply a drive voltage to the wire 112.

For example, in some embodiments, as illustrated in FIG. 2, the tunable band-stop filter further includes a first alignment film 171 and a second alignment film 172. The first alignment film 171 is provided on a surface of the first substrate 110 near the liquid crystal layer 130. The second alignment film 172 is provided on a surface of the second substrate 120 near the liquid crystal layer 130. The first alignment film 171 and the second alignment film 172 are configured to align liquid crystal molecules in the liquid crystal layer 130, so that the liquid crystal molecules in the liquid crystal layer 130 have a certain initial deflection angle, which facilitates the liquid crystal molecules to deflect under a drive of a bias voltage of the wire 112 and the common electrode 122, and the corresponding speed is improved.

For example, in some embodiments, as illustrated in FIG. 2, the tunable band-stop filter further includes microspheres 138 provided in the liquid crystal layer 130 and configured to support a space between the first substrate 110 and the second substrate 120.

Figure 3:
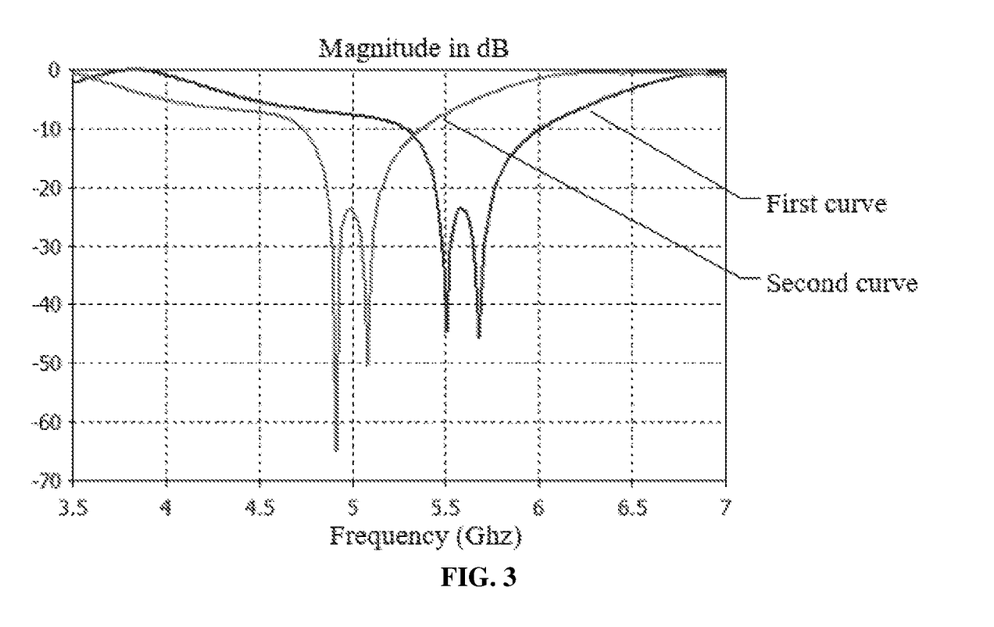
FIG. 3 is a numerical simulation result diagram of a simulation model of a tunable band-stop filter provided by an embodiment of the present disclosure.

FIG. 3 is a numerical simulation result diagram of a simulation model of a tunable band-stop filter provided by an embodiment of the present disclosure. In this simulation model, the wire length in the second wire structure is 30 mm, the widths of the wire 112, the first signal line 161, and the second signal line 162 are all 0.5 mm, the thickness of the liquid crystal layer 130 is 0.2 mm, the thickness of the first base substrate 111 and the second base substrate 121 are both 0.5 mm, and the dielectric constants of the first base substrate 111 and the second base substrate 121 are both 3.8.

As described above, an orientation of liquid crystal molecules in the liquid crystal layer 130 may be changed from horizontal orientation to vertical orientation (relative to the first substrate or the second substrate) under the drive of the bias electric field between the wire 112 and the common electrode 122, and the dielectric constant of the liquid crystal molecules changes from 2.5 to 3.3 at this time. As illustrated in FIG. 3, the first curve represents a transmission characteristic (S21) when the liquid crystal molecules in the liquid crystal layer are in a horizontal state (no drive voltage is applied), and at this time the dielectric constant of the liquid crystal molecules is 2.5; the second curve represents a transmission characteristic (S21) when the liquid crystal molecules in the liquid crystal layer are in a vertical state (a drive voltage is applied), and at this time the dielectric constant of the liquid crystal molecules is 303. As can be seen from FIG. 3, after the application of the drive voltage, the orientation of the liquid crystal molecules changes from horizontal orientation to vertical orientation, and a band resistance of the tunable band-stop filter shifts, a center operation frequency of the band resistance changes significantly (the center operation frequency of the band resistance ranges from 5 Ghz to 5.6 Ghz), and the regulation range is greater than 10%.

It is worth noted that in the above simulation model, only the dielectric constant of liquid crystal molecules directly below a wire are designed to be change under an action of a drive voltage, while the dielectric constant of liquid crystal molecules in other places remain unchanged. However, in fact, the dielectric constant of liquid crystal molecules around the wire may also change under the action of the drive voltage. So, this numerical simulation method is the most conservative calculation of performance of the tunable band-stop filter designed by the inventors, that is, the actual regulation range of the tunable band-stop filter designed by the inventors is better than the above numerical simulation result.

Figure 4:
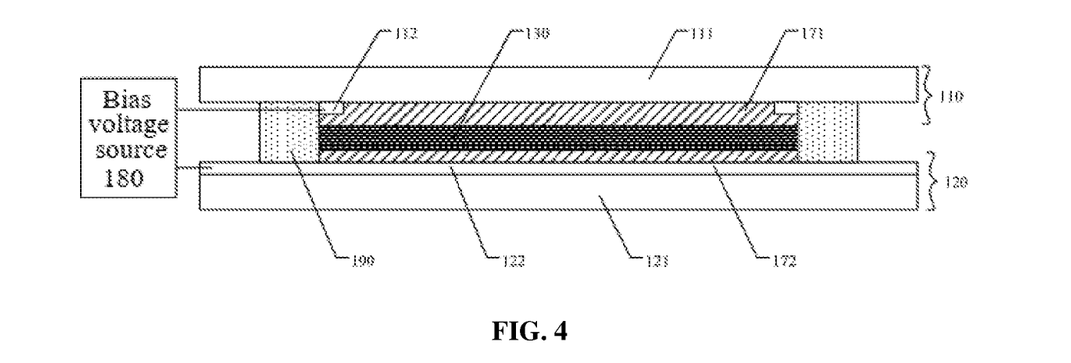
FIG. 4 is a schematic view of a tunable band-stop filter provided by an embodiment of the present disclosure.

FIG. 4 is a schematic diagram of a tunable band-stop filter provided by an embodiment of the present disclosure. As illustrated in FIG. 4, the tunable band-stop filter further includes a bias voltage source 180 which is electrically connected to the wire 112 and configured to apply a drive voltage to the wire 112.

Figure 5:
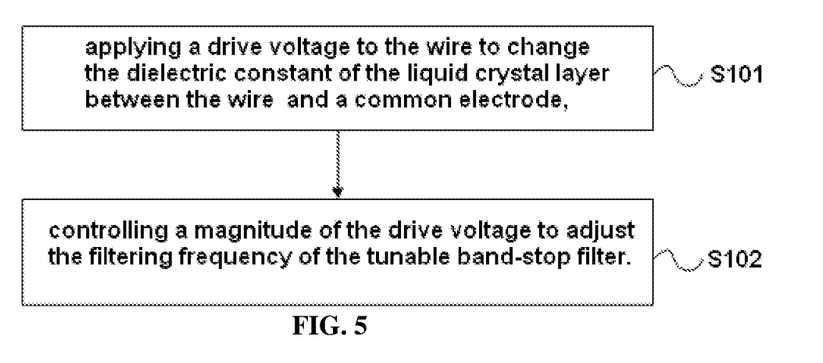
FIG. 5 is a flowchart of a method of driving a tunable band-stop filter provided by an embodiment of the present disclosure.

At least one embodiment of the present disclosure also provides a method of driving a tunable band-stop filter. The tunable band-stop filter may be any one of the tunable band-stop filters described above. FIG. 5 is a flowchart of a method of driving a tunable band-stop filter according to an embodiment of the present disclosure. As illustrated in FIG. 5, the driving method includes the following steps:

Step S101: applying a drive voltage to a wire 112 to change a dielectric constant of a liquid crystal layer between the wire 112 and a common electrode 122.

For example, the drive voltage is applied to the wire 112 through a bias voltage source 180 to change the dielectric constant of the liquid crystal layer between the wire 112 and the common electrode 122. In this way, a band resistance of the tunable band-stop filter may be changed.

Step S102: controlling a magnitude of the drive voltage to adjust a filtering frequency of the tunable band-stop filter.

In the method of driving the tunable band-stop filter provided by this embodiment, the filtering frequency range of the tunable band-stop filter may be adjusted only by controlling the magnitude of the drive voltage. In this way, a simple and efficient tunable band-stop filter can be provided.

At least one embodiment of the present disclosure also provides an electronic device. The electronic device includes any one of the tunable band-stop filter described above. The electronic device can realize band-stop filtering by using the phase reverse cancellation principle, and change a dielectric constant of a liquid crystal layer by applying a drive voltage to the wire. In this way, a filtering frequency range, i.e., the frequency range where the phase reverse cancellation occurs, may be changed. In addition, because the tunable band-stop filter has advantages of wide effective operation frequency range, simple structure, low production cost, small loss, small non-linear noise, large regulation range, and the like, the electronic device also has the advantages described above.

Figure 6:
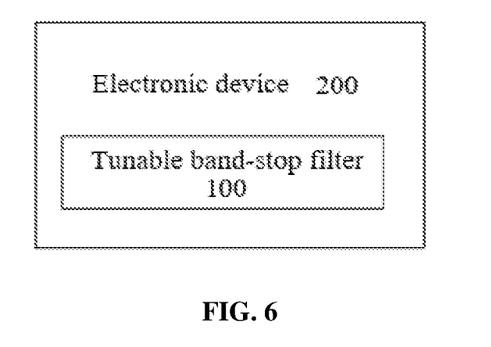
FIG. 6 is a schematic block diagram of an electronic device provided by an embodiment of the present disclosure.

FIG. 6 is a schematic block diagram of an electronic device provided by an embodiment of the present disclosure. As illustrated in FIG. 6, the electronic device 200 includes a tunable band-stop filter 100. The tunable band-stop filter 100 is a tunable band-stop filter provided by any of the above embodiments.

For example, the electronic device may be an electronically controlled scanning antenna, a radar system, an accelerator, a communication base station, a power divider, or any device including a tunable band-stop filter, and the embodiments of the present disclosure do not limit it. The electronic device may also include more components, and the connection relationship between each component and the tunable band-stop filter is not limited.

The following points should be noted:

(1) The accompanying drawings involve only the structure(s) in connection with the embodiment(s) of the present disclosure, and other structure(s) can be referred to common design(s).

(2) Without conflicting with each other, elements in one embodiment or in different embodiments can be combined.

The above description is only the specific implementations of the present disclosure, and the scope of the present disclosure is not limited thereto. Those skilled in the art can easily contemplate changes and replacements within the technical scope of the disclosure, and such changes and replacements shall fall into the scope of the present disclosure. The scope of the present disclosure should be defined by the scope of the claims.

What is claimed is:

1. A tunable band-stop filter, comprising:
   a first substrate comprising a first base substrate and a wire structure on the first base substrate;
   a second substrate comprising a second base substrate and a common electrode on the second base substrate; and
   a liquid crystal layer between the first substrate and the second substrate, wherein the wire structure comprises a first wire structure and a second wire structure, and a first endpoint of the first wire structure is connected to a first endpoint of the second wire structure, a second endpoint of the first wire structure is connected to a second endpoint of the second wire structure, the first endpoint of the first wire structure and the first endpoint of the second wire structure are configured to input electromagnetic wave signals, the second endpoint of the first wire structure and the second endpoint of the second wire structure are connected and configured to output the electromagnetic wave signals, the first wire structure, the common electrode and a liquid crystal layer between the first wire structure and the common electrode constitute a first phase modulation structure, and the second wire structure, the common electrode and a liquid crystal layer between the second wire structure and the common electrode constitute a second phase modulation structure.

2. The tunable band-stop filter according to claim 1, wherein the first substrate comprises a wire arranged on the first base substrate, and the wire is connected end to end to form the wire structure.

3. The tunable band-stop filter according to claim 2, wherein the wire is a bent wire.

4. The tunable band-stop filter according to claim 3, wherein the wire is a serpentine bent wire.

5. The tunable band-stop filter according to claim 4, wherein the first phase modulation structure and the second phase modulation structure are configured to modulate phases of electromagnetic wave signals input from the first endpoint of the first wire structure and the first endpoint of the second wire structure, respectively, to allow a phase of an electromagnetic wave having a filtering frequency range among electromagnetic wave signals modulated by the first phase modulation structure to be opposite to a phase of an electromagnetic wave having the filtering frequency range among electromagnetic wave signals modulated by the second phase modulation structure.

6. The tunable band-stop filter according to claim 5, wherein the second phase modulation structure is configured to change a phase of an electromagnetic wave having the filtering frequency range among the electromagnetic wave signals by 90 degrees, and the first phase modulation structure is configured to change a phase of an electromagnetic wave having the filtering frequency range among the electromagnetic wave signals by 270 degrees.

7. The tunable band-stop filter according to claim 6, wherein a wire length of a first wire structure in the first phase modulation structure is three times a wire length of a second wire structure in the second phase modulation structure.

8. The tunable band-stop filter according to claim 7, wherein the first wire structure comprises three sub-first wire structures, and wire lengths of the three sub-first wire structures are equal to each other.

9. The tunable band-stop filter according to claim 8, wherein the wire is further configured to apply a drive voltage to form a bias electric field with the common electrode, to change a dielectric constant of the liquid crystal layer between the wire and the common electrode.

10. The tunable band-stop filter according to claim 9, further comprising:
a bias voltage source, electrically connected to the wire and configured to apply the drive voltage to the wire.

11. The tunable band-stop filter according to claim 10, further comprising:

a first signal line connected to the first endpoint of the first wire structure and the first endpoint of the second wire structure; and
a second signal line connected to the second endpoint of the first wire structure and the second endpoint of the second wire structure.

12. The tunable band-stop filter according to claim 11, further comprising:
a first alignment film arranged on a surface of the first substrate near the liquid crystal layer; and
a second alignment film arranged on a surface of the second substrate near the liquid crystal layer,
wherein the first alignment film and the second alignment film are configured to align liquid crystal molecules in the liquid crystal layer.

13. The tunable band-stop filter according to claim 12, further comprising:
microspheres provided in the liquid crystal layer and configured to support a space between the first base substrate and the second base substrate.

14. The tunable band-stop filter according to claim 13, wherein the liquid crystal comprises nematic liquid crystal.

15. A method of driving the tunable band-stop filter according to claim 1, comprising:
applying a drive voltage to the wire to change a dielectric constant of a liquid crystal layer between a wire and the common electrode; and
controlling a magnitude of the drive voltage to adjust a filtering frequency range of the tunable band-stop filter.

16. An electronic device, comprising the tunable band-stop filter according to claim 1.

17. The tunable band-stop filter according to claim 1, wherein the first phase modulation structure and the second phase modulation structure are configured to modulate phases of electromagnetic wave signals input from the first endpoint of the first wire structure and the first endpoint of the second wire structure, respectively, to allow a phase of an electromagnetic wave having a filtering frequency range among electromagnetic wave signals modulated by the first phase modulation structure to be opposite to a phase of an electromagnetic wave having the filtering frequency range among electromagnetic wave signals modulated by the second phase modulation structure.

18. The tunable band-stop filter according to claim 17, wherein the second phase modulation structure is configured to change a phase of an electromagnetic wave having the filtering frequency range among the electromagnetic wave signals by 90 degrees, and the first phase modulation structure is configured to change a phase of an electromagnetic wave having the filtering frequency range among the electromagnetic wave signals by 270 degrees.

19. The tunable band-stop filter according to claim 2, wherein the first phase modulation structure and the second phase modulation structure are configured to modulate phases of electromagnetic wave signals input from the first endpoint of the first wire structure and the first endpoint of the second wire structure, respectively, to allow a phase of an electromagnetic wave having a filtering frequency range among electromagnetic wave signals modulated by the first phase modulation structure to be opposite to a phase of an electromagnetic wave having the filtering frequency range among electromagnetic wave signals modulated by the second phase modulation structure.

20. The tunable band-stop filter according to claim 19, wherein the second phase modulation structure is configured to change a phase of an electromagnetic wave having the filtering frequency range among the electromagnetic wave signals by 90 degrees, and the first phase modulation structure is configured to change a phase of an electromagnetic wave having the filtering frequency range among the electromagnetic wave signals by 270 degrees.

* * * * *